United States Patent Office 3,042,639

Patented July 3, 1962

3,042,639

MAGNETIC IRON OXIDE COATING COMPOSITIONS FOR RECORDING TAPE

Pierrepont Adams, Darien, and Lawrence E. Knees, New Canaan, Conn., assignors to Reeves Soundcraft Corp., Springdale, Conn., a corporation of Connecticut No Drawing. Filed June 11, 1956, Ser. No. 590,361
12 Claims. (Cl. 260—23)

This invention relates to magnetic recording tape of the type in which a coating of magnetic iron oxide particles dispersed in an adherent binder is applied to the surface of a strip of flexible material which serves as a carrier or support therefor.

In magnetic recording tape, a consideration of primary importance is signal output. This is dependent, of course, on various factors including the nature of the iron oxide particles, the nature of the adherent binder, the proportion of iron oxide to binder, the thickness of the coating, and the density of the coating.

One purpose of the present invention has to do with the last named factor, and it is an object of the invention to provide methods and means to increase the density of a given coating beyond that which is normally observed for that coating. As a result, it is possible to increase the output signal obtainable from tape coated therewith, or alternatively to obtain the same output with a thinner coating.

In any given coating, if the densities of the magnetic oxide and of the binder and the ratio in which they are mixed are known, it is possible to calculate the theoretical density of the coating. The density of $Fe_2O_3$ is 4.59 grams per cubic centimeter; if we assume a density of 1.2 grams per cubic centimeter for the binder, and if we assume further that the percentage of ferric oxide in the coating is 75 percent by weight, the theoretical density of the coating would be expressed as follows:

$$\frac{100}{\frac{75}{4.59}+\frac{25}{1.2}}=2.69 \text{ gm./cc.}$$

Examination of many samples of tape, however, has shown that the theoretical density is seldom, if ever, realized, and that actual densities of both commercial and experimental tape coatings usually fall far short of the theoretical density. The reasons for this disparity are not entirely clear, but are believed to have to do with the presence of gases or voids in the coating composition which are not eliminated before the coating hardens after being applied to the carrier strip. But whatever the reasons, there is no doubt that the nearer the theoretical density can be approached, the better the output characteristics of the coated tape.

It is also a purpose of the present invention to lower the electrical resistance of magnetic tapes to minimize the creation of static electric charges on the tape. Static electric charges cause an interruption of signal if they are discharged as a spark on the recording or playback head. They also cause trouble in handling the tape because of the tendency of the tape to be attracted to other surfaces when the charges are present. Polyethylene terephthalate tape base is particularly prone to the creation of static electric charges, but other tape bases such as cellulose acetate may also be subject to it.

If the electrical resistance of the coating is reduced static electric charges are not built up on the tape for they leak off as they are generated.

Another purpose of this invention is to reduce the friction between the tape and magnetic head during recording and playback. Excessive friction causes an undesirable audible sound, called squeak.

This invention is based on the discovery that the density of such coatings can be substantially increased and the electrical resistance and squeak reduced by adding to the coating composition a minor proportion of mono or polyamine salts which correspond to the following general formula:

in which R, R′, R″ represent hydrogen, alkyl or aryl radicals, amino alkyl radicals, or N-alkyl amino alkyl radicals, or those radicals wherein the alkyl may be alkoxy or hydroxyalkyl, provided at least one of the positions so indicated is not hydrogen, and A represents the acid with which the amine salt is formed.

The invention involves incorporating from about 0.1 percent to about 10 percent by weight of the amine salt to the total solids in the coating composition, and, preferably, the amine salt is added to the coating composition after the usual dispersion of the oxide into the binder has been completed.

A group of amines found to be very useful for incorporation into the coating compositions for the tapes may be represented by the formula:

$$RNHCH_2CH_2CH_2NH_2$$

and are known chemically as substituted propylene diamines. The R represents an N alkyl group which may be as long as 18 carmon atoms. The propylene group may be considered a typical short chain alkylene group, which may range in length from about 2 to 5 or 6 carbon atoms. The presence of the two amino groups in the compound separated by the short alkylene group apparently gives the compound certain characteristics, which appear to make it useful for adsorption on to the surface of the iron oxide pigment particles, with the result that apparently a closer packing of these pigment particles can take place. This is related to the displacement of any adsorbed gases on the particles and thus to the increased density of coating obtained with the coating composition.

Amines are of alkaline reaction. When they are reacted with an acid at each amino group they become salts and become essentially neutral, but this is not a requirement for satisfactory performance in the present invention.

The details of the improved electrical properties of the tapes coated with coating compositions in accordance with this invention, will be better understood by reference to the tabulation of properties given in Table I. The results listed in the table were obtained by comparing a tape made with no amine salt added to the coating composition with tapes made with the addition of from 1 to 3 percent of the amine salt, based on total solids in the coating composition. The following coating composition, was used in all cases; it is typical of the magnetic coating composition used in the manufacture of magnetic recording tape: To 55.4 grams of 20 percent copolymer of vinyl chloride and vinyl acetate (Bakelite Co. Vinylite Resin VAGH was used) dissolved in equal parts of methyl isobutyl ketone and toluene was added 70 grams of magnetic iron oxide, 75 cubic centimeters of methyl isobutyl ketone, and 50 cc. of toluene. This mixture was ground in a standard laboratory ball mill for about 40 hours. There was then added 67.7 grams of 20 percent butadiene-acrylonitrile rubber (B. F. Goodrich Chemical Co. Hycar 1432 was used) in two parts of methyl isobutyl ketone and one part of toluene, 10 cc. of isopropanol, and the desired amount of amine salt. The percentages of the latter material given in the following tables are based on the total solids present. After this final addition the mixture was ground for 4 hours longer. Then the mixture was filtered and coated on polyester film of a thickness of 1.5 mils (Du Pont Mylar film was used).

After slitting these coated samples to 1/4 inch widths their electrical properties and densities were determined.

We have experimented with adding the amine salts to the vinyl resin at the start of the grinding operation, but less than optimum results generally followed. This is also true in dispersing systems using alternative film forming resinous bases. It therefore seems that the oxide should be thoroughly dispersed in the coating composition before adding the amine salt.

Variations in the amine salt composition can be made by changes in the identity of the amine as well as changes in the identity of the salt-forming acid. These variables have been explored and the results are summarized in the following tables. In this manner it is possible to determine which salt should be used to give the optimum results.

In Table I, results obtained with a diamine composition made from cocoanut fatty acids and marketed by Armour & Co. as Duomeen-C was used. In this composition the radical R in the generalized formula varies from $C_8H_{17}$ to $C_{18}H_{37}$ with about 50 percent of it being $C_{12}H_{25}$. Similar materials prepared from soya fatty acids, Duomeen S, and tallow fatty acids, Duomeen T, gave comparable results. Description of the compounds may be found published at Chemical and Engineering News, October 10, 1955, page 4342.

It will be quite apparent from an inspection of these results that all of the diamine salts listed have the effect of raising the density of the coating material and lowering the electrical resistance. The higher molecular weight acids give improved results over those obtained with the lower molecular weight acids. For example: The dioleate salt gives a density of 1.943 at 2 percent by weight; the diacetate gives 1.687 at 2 percent by weight; and the coating with no amine salt added gives 1.533. A corresponding relationship appears in the output when it is compared with the improved density.

TABLE I

*Diamine Salts and Their Effect in Tape Coating*

| Salt Used and Amount, Percent Total solids | Density of coating, g./cc. | Relative Output in db | | | Electrical resistance,[2] meg × 1,000 |
|---|---|---|---|---|---|
| | | 1 kc. | 15 kc. | 3% 1 kc.[1] | |
| Diacetate: | | | | | |
| 1 | 1.669 | −2.1 | −0.3 | 11.7 | 64–190 |
| 2 | 1.687 | −1.7 | 0 | 12.4 | 78–180 |
| 3 | 1.725 | −1.3 | −0.3 | 13.0 | 40–55 |
| Dilactate: | | | | | |
| 1 | 1.748 | −1.6 | −0.3 | 12.7 | 88–125 |
| 2 | 1.767 | −1.3 | 0.2 | 13.0 | 56–78 |
| 3 | 1.770 | −1.0 | 1.3 | 13.2 | 32–78 |
| Dicaprylate: | | | | | |
| 1 | 1.843 | −1.2 | 0 | 13.0 | 66–115 |
| 2 | 1.912 | −0.7 | 1.4 | 14.2 | 45–50 |
| 3 | 1.973 | −0.6 | 1.0 | 14.3 | 30–40 |
| Dilaurate: | | | | | |
| 1 | 1.885 | −1.2 | 0.4 | 12.9 | 72–140 |
| 2 | 1.940 | −0.4 | 1.5 | 14.2 | 54–115 |
| 3 | 1.996 | −0.3 | 1.9 | 14.4 | 50–78 |
| Dioleate: | | | | | |
| 1 | 1.892 | −1.0 | 0.7 | 13.7 | 66–130 |
| 2 | 1.943 | −0.1 | 1.6 | 14.7 | 45–80 |
| 3 | 2.003 | −0.2 | 2.0 | 14.8 | 32–78 |
| Monooleate, 2 | 1.963 | −1.1 | −1.1 | 14.0 | 60–120 |
| Dinaphthenate, 2 | 1.911 | −1.9 | −1.3 | 12.4 | 54–110 |
| Only Oleic Acid, 1.3 | 1.889 | −2.1 | −1.7 | 12.5 | 60–200 |
| Doumeen C, 0.7 | 1.769 | −2.4 | −2.5 | 12.2 | 150–220 |
| No addition, 0 | 1.533 | −5.5 | −7.0 | 9.3 | 290–300 |

[1] Relative output in db for 3% distortion at 1 kc.
[2] Electrical resistance per inch of length and for coatings 0.6 mil thick (0.0006 inch thick).

The second variable in the amine salt used as the additive for the coating composition is in the amine used to form the salt with a definite acid. Accordingly, since the higher molecular weight acids seemed to give best results as measured by output and density of tape, a series of tests was made with oleic acid, as a representative high molecular weight acid, forming the salt with the variation being made in the identity of the amine used. In this sequence of tests oleic acid was used to form a salt with the amines listed. The results are summarized in Table II.

TABLE II

*Amine Salts of Oleic Acid and Their Effect in Tape Coating*

(In each case, 2 percent by weight, based on total solids, of amine salt was used.)

| Name and formula of amine | Density of coating, g./cc. | Relative Output in db | | | No. of mols. of oleic acid per mol of amine | Electrical resistance,[2] meg× 1,000 |
|---|---|---|---|---|---|---|
| | | 1 kc. | 15 kc. | 3% 1 kc.[1] | | |
| Triethanolamine $(HOCH_2CH_2)_3N$ | 1.845 | −1.6 | −1.2 | 13.0 | 1 | 62–140 |
| Diphenylamine $(C_6H_5)_2NH$ | 1.830 | −3.0 | −4.5 | 11.4 | 1 | 100–165 |
| 3-Methoxy-propylamine $CH_3O(CH_2)_3NH_2$ | 1.877 | −1.9 | −1.5 | 12.4 | 1 | 130–220 |
| 3-Isopropoxy-propylamine $(CH_3)_2CHO(CH_2)_3NH_2$ | 1.947 | −2.0 | −1.7 | 12.3 | 1 | 95–190 |
| 3-Dimethyl-aminopropylamine $(CH_3)_2N(CH_2)_3NH_2$ | 1.882 | −2.0 | −2.0 | 12.3 | 2 | 26–120 |
| 3-Dibutyl-amino propylamine $(C_4H_9)_2N(CH_2)_3NH_2$ | 1.896 | −1.8 | −1.7 | 12.5 | 2 | 40–130 |
| t-octylamine t-$(C_8H_{17})NH_2$ | 1.999 | −1.5 | −1.5 | 13.0 | 1 | 140–220 |
| Armeen 2 HT $(C_{18}H_{37})_2NH$ | 1.913 | −2.3 | −4.0 | 12.2 | 1 | 54–115 |
| Amine O 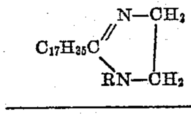 | 1.913 | −1.4 | −2.0 | 13.4 | 1 | 110–180 |

[1] Relative output in db for 3% distortion at 1 kc.
[2] Electrical resistance per inch of length and for coatings 0.6 mil thick. (0.0006 inch thick)

Inspection of the results summarized in Table II indicates quite clearly that again amine salts of the high molecular weight acids, exemplified by oleic acid, raise the density of the coating and lower the electrical resistance. Some amines are more effective for the purpose than others. In general the effect is to raise the density of the coating from about 1.553, with no additive, to a range from about 1.85 to 2.0 when about 1 to 3 percent of amine salt is added to the coating composition.

The reduction of the electrical resistance is a real advantage flowing from the use of the amine salts. When magnetic tapes are used for recording or playback static charges are developed on the tapes if the resistance is high. These charges cause trouble in handling the tape because of its attraction to other materials. Discharge sparks may also occur on the recording or playback head and cause an interruption in the signal. When the electrical resistance of the tape is reduced there is less static charge developed for it continually leaks off and the above-mentioned difficulties are not encountered.

Another valuable result of the addition of an amine salt to a coating composition is a marked reduction in or elimination of what is known as "squeak," that is, the noise which results from the rubbing of the coated face of the recording tape against the magnetic heads which are used both in recording and playback. At present, silicone resins are frequenly added to coating compositions in an effort to reduce or eliminate squeak, but such resins are quite expensive. The reduction in squeak resulting from the addition of amine salts in accordance with the present invention is sufficient to permit a reduction in the amount of silicone resin used, or in some cases to permit its elimination entirely.

In all of the tests summarized in the tabulations, $\gamma$-magnetic iron oxide of acicular form was used, principally because it is a magnetic material which is commonly used in the manufacture of tape. In order to determine whether the effect of increased density and accompanying improvement in output is obtained with other oxides, certain others were tested by adding 2 percent of the Duomeen C dioleate to the coating compositions. In the following summary, the first test shows the density of the tape so treated with the second test as a control to show the density of the same tape without the amine salt addition.

TABLE III

*Variations in Pigments*

| Pigment | Density of coating, g./cc. | Electrical resistance [1] meg × 1,000 |
|---|---|---|
| Cubic magnetic iron oxide | 2.359<br>2.279 | 140–350<br>140–280 |
| Magnetit Zs from Germany | 2.379<br>2.380 | 250–400<br>250–400 |
| Magnetit EN from Germany | 2.416<br>2.475 | 350–400<br>300–400 |
| 600 Light lemon yellow iron oxide, non-magnetic | 1.579<br>1.505 | 340–400<br>350–400 |
| Titanox RA, non-magnetic | 2.361<br>2.340 | 300–380<br>320–400 |

[1] Electrical resistance per inch of length and for coatings 0.6 mil thick (0.0006 inch).

It is quite apparent that no significant improvement in coating density was obtained with these several different oxides utilizing the amine salt identified, whereby it is quite clear that the fundamental factor responsible for the improved output effect noted is peculiar to the acicular gamma iron oxide. However, considerable improvement in reduction of squeak was noted.

Since the amine salt, when added to the coating compostion, has a softening action on the tape because it functions as a plasticizer in the composition, it is desirable to offset this effect by reformulating the coating compositions with hard resins as starting materials. Since the incorporation of the amine salts in the coating composition reduces the tendency of the tapes to squeak, formulation of a hard resin with the amine salt is definitely desirable. Further, the amine salt raises the density of the coating, reduces its electrical resistance, and increases output, effectively, moving each property in a favorable direction to give an ultimate improved product.

A processing advantage also results from the incorporation of the amine salts in the formulation, because their addition results in a lowering of the viscosity of the coating composition. This results in an easier flowing composition, which gives a smooth coating with reduced amounts of organic solvents.

In the foregoing description of tapes it is to be understood that any suitable base may be used. Currently polyester films are in favor as bases for commercial tapes. Cellulose acetate film such as that used for moving picture film bases may also be used as well as paper bases or any other suitable film.

Similarly, other film-forming resins used in commercial tapes are also contemplated for use in the coating composition. A typical adhesive coating for the tape base would be polyvinyl acetate in 95 parts of a solvent of about equal parts toluene and ethyl acetate. As resins for the coating composition, acrylic acid esters and methacrylic acid esters may also be used. High molecular weight hydrocarbon resins are also useful as are mixtures of these with butadiene-styrene synthetic rubber types.

Though the invention has been described with reference to a limited number of examples, it is to be understood that variations thereof may be practiced without departing from its spirit or scope.

What is claimed is:

1. A composition for forming a flexible coating on synthetic resin flexible tape bases consisting essentially of a water insoluble, synthetic organic film-forming resin solution, capable of forming a flexible film, acicular gamma iron oxide dispersed therein and about 1–10 percent by weight of an amine salt, based on total solids, in which the amine salt is an N-alkyl alkylene diamine in which the alkyl groups range in size from $C_8$ to $C_{18}$ with the average about $C_{12}$, and the alkylene groups average 2–6 carbon atoms, and the salt forming acid is a high molecular weight organic acid having about 8 to about 25 carbon atoms.

2. A composition in accordance with claim 1 in which the salt forming acid is oleic acid.

3. A composition in accordance with claim 1 in which the salt forming acid is oleic acid and the salt is the dioleate.

4. A composition in accordance with claim 1 in which the salt forming acid is lauric acid.

5. A composition in accordance with claim 1 in which the salt forming acid is naphthenic acid.

6. A composition in accordance with claim 1 in which the amine salt is 3-dodecylaminopropylamine dioleate.

7. The method of increasing the density and improving the electrical properties of magnetic recording tapes which comprises dispersing an acicular gamma magnetic iron oxide in a water-insoluble, synthetic organic film-forming resin solution to form a suspension useful for coating purposes to form a flexible coating, thereafter incorporating about 1–10 percent by weight of an amine salt in the said suspension said weight being based on total solids, and applying the said suspension to a flexible synthetic resin tape base to form a coated base suitable for cutting into tapes, the amine salt being an N-alkyl alkylene diamine in which the alkyl groups range in size from $C_8$ to $C_{18}$ with the average about $C_{12}$, and the alkylene groups average 2–6 carbon atoms, and the salt forming acid is a high molecular weight organic acid having about 8 to about 25 carbon atoms.

8. The method in accordance with claim 7 in which the salt forming acid is oleic acid.

9. The method of accordance with claim 7 in which the salt forming acid is oleic acid and the salt is the dioleate.

10. The method in accordance with claim 7 in which the salt forming acid is lauric acid.

11. The method in accordance with claim 7 in which the salt forming acid is napthenic acid.

12. The method in accordance with claim 7 in which the amine salt is 3-dodecylaminopropylamine dioleate.

References Cited in the file of this patent

UNITED STATES PATENTS

| | | |
|---|---|---|
| 2,539,685 | Ballard et al. | Jan. 30, 1951 |
| 2,607,710 | Schmelzle et al. | Aug. 19, 1952 |
| 2,615,007 | Greenlee | Oct. 21, 1952 |
| 2,624,725 | Bjorksten et al. | Jan. 6, 1953 |
| 2,626,876 | Carnes | Jan. 27, 1953 |
| 2,683,131 | Cass | July 6, 1954 |
| 2,689,167 | Dovey et al. | Sept. 14, 1954 |
| 2,690,407 | Pessel | Sept. 28, 1954 |
| 2,804,401 | Cousino | Apr. 11, 1955 |

FOREIGN PATENTS

| | | |
|---|---|---|
| 681,992 | Great Britain | Nov. 5, 1952 |
| 153,598 | Australia | Oct. 13, 1953 |

OTHER REFERENCES

Perry: "Chem. Engineers' Handbook," pp. 1540–1, Second Edition, 1941, McGraw-Hill.

Mattiello: "Protective and Decorative Coatings," vol. IV, John Wiley, New York, New York (1944), pp. 64–65.

Moilliet et al.: "Surface Activity," E. and F. N. Spon, Ltd., London (1951), pp. 324–327, and 202–205.